Patented Feb. 20, 1951

2,542,291

UNITED STATES PATENT OFFICE 2,542,291

PROCESS FOR THE PRODUCTION OF 7-DEHYDROCHOLESTEROL

Kurt Herbert Schaaf, Jamaica, N. Y., assignor to Nopco Chemical Company, Harrison, N. J., a corporation of New Jersey No Drawing. Application October 22, 1947, Serial No. 781,497

18 Claims. (Cl. 260—397.2)

This invention relays to the production of dehydrosterols, and more particularly to an improved process for the production of 7-dehydrosterols.

In British Patent Specification No. 574,432 there is disclosed a process for the production of 7-dehydrosterols wherein sterol esters are halogenated with a suitable N-halogenated acid amide or imide after which the halogenated ester is dehydrohalogenated to produce the corresponding 7-dehydrosterol ester. The 7-dehydrosterol ester is then separated from the dehydrohalogenation reaction mixture either by admixing the reaction mixture with an excess of an aqueous acid solution, e. g., an aqueous 10% hydrochloric acid solution, and the resulting mixture then extracted with a solvent such as ether or a hydrocarbon solvent, e. g., petroleum ether, to extract the 7-dehydrosterol ester from the aqueous mixture; or the dehydrohalogenation reaction mixture is dissolved in an excess of a water-immiscible solvent such as petroleum ether, and the resulting solvent solution then extracted with an aqueous acid solution, e. g., an aqueous 10% hydrochloric acid solution, to remove the dehydrohalogenating agent from the solvent solution. The solvent solution containing the 7-dehydrosterol ester is then in each case washed with a dilute alkali solution, e. g., a 10% sodium carbonate solution, to remove any acid dissolved in the solvent, and thereafter the solvent solution is washed with water to remove any alkali dissolved in the solvent. The solvent is then evaporated to obtain the 7-dehydrosterol ester. Since the solvent which has been used in separating the 7-dehydrosterol ester from the dehydrohalogenation reaction mixture is invariably a solvent which is not very well suited as a vehicle in which to carry out the saponification of the ester to produce the free sterol, it is necessary to evaporate off this solvent after the solvent solution has been acid, alkali and water washed, and then the 7-dehydrosterol ester which is recovered is redissolved in another solvent such as ethyl alcohol in which the saponification may be carried out. Following the saponification of the ester, the crude free 7-dehydrosterol is recovered from the saponification solution. This may be done by adding water to the saponification solution and extracting the resulting solution with a water-immiscible solvent such as ether or, if only a small amount of water has been added, the crude 7-dehydrosterol may be recovered by crystallization.

French Patent No. 901,551 which discloses a process for producing 7-dehydrosterols which is essentially the same as the process of the above-identified British patent utilizes essentially the same procedure as is employed in the British patent to separate the 7-dehydrosterol ester from the dehydrohalogenation reaction mixture and thereafter to obtain the crude free 7-dehydrosterol.

Such methods of obtaining a 7-dehydrosterol from a dehydrohalogenation reaction mixture are cumbersome, time consuming, and frequently result in a considerable loss of valuable 7-dehydrosterol ester through the formation of intractable emulsions as the separation of the various phases during the different extractions is far from being 100% effective. In general, the procedures based on extractions with immiscible solvents increase the cost of and complicate the overall process of producing the 7-dehydrosterol. A separate hydrolysis step as described in the prior art also increases the cost of production.

It is evident from the cited patents and other prior art that it has always been believed necessary to separate a 7-dehydrosterol ester from the dehydrohalogenation reaction mixture prior to converting the 7-dehydrosterol ester to the free 7-dehydrosterol. Such a belief is quite natural and purely logical since it would seem that the free 7-dehydrosterol would be far simpler to recover, would be much more efficiently recovered, and that the product obtained would have a higher purity if such separation from the dehydrohalogenation reaction mixture were made prior to converting the ester to the free sterol.

It is the object of this invention to provide a highly improved process for producing 7-dehydrosterols.

A further object of the invention is to provide a process for producing 7-dehydrosterols which is simpler and more efficient than prior art processes.

Another object of the invention is to provide a process for producing 7-dehydrosterols which can be carried out in a much shorter period of time than prior art processes.

Other objects of the invention will in part be obvious and will in part appear hereinafter.

I have discovered, contrary to what has always been believed in the prior art, that it is entirely unnecessary to separate the 7-dehydrosterol ester from the dehydrohalogenation reaction mixture prior to converting the ester to the free sterol, and that the ester may be converted to the free sterol right in the dehydrohalogenation reaction mixture and the free sterol then readily and easily separated from the mixture in excellent yield. Thus I have discovered that what was previously believed to be an essential step in the production of a 7-dehydrosterol, i. e. the separation of the 7-dehydrosterol ester from the dehydrohalogenation reaction mixture, may be entirely eliminated. The advantages of the elimination of that step from a process for producing a 7-dehydrosterol are manifold. In the first place the entire series of operations necessary to carry out that step are completely eliminated. Thus a very considerable saving in the time required to carry out the overall process is effected, the cost of the overall process is considerably reduced by savings in solvents and reagents normally required for the separation step, and much less equipment is required for the overall process since by eliminating the separation step it is possible to carry out the main steps of the overall process after the halogenation step in one reaction vessel. In the second place by eliminating the separation step of the prior art processes, slightly better yields of the desired 7-dehydrosterol will usually be obtained. The reason for this is that in the prior art processes a certain amount of loss of the 7-dehydrosterol ester inevitably took place in the separation process as has been pointed out hereinabove. By eliminating that step, losses of 7-dehydrosterol which would occur in such a step are thus eliminated. It would be quite logical to assume that difficulty would be encountered in recovering the free 7-dehydrosterol from the dehydrohalogenation reaction mixture, that such recovery would be quite inefficient, and that appreciable losses of valuable 7-dehydrosterol would occur because of the inefficiency of such recovery. However, I have discovered that such is not the case at all and that instead the free 7-dehydrosterol may be recovered from the dehydrohalogenation reaction mixture with practically no loss whatsoever. Furthermore, the purity of the 7-dehydrosterol which is recovered is just as high as and usually higher than the purity of 7-dehydrosterols produced by the prior art processes referred to hereinabove.

In carrying out the process of my invention, any prior art process for the production of a 7-dehydrosterol which is similar either to the process of the British patent or to the process of the French patent, both identified hereinabove, may be utilized with the modification, however, that in every case the conversion of the 7-dehydrosterol ester to the free 7-dehydrosterol is carried out right in the dehydrohalogenation reaction mixture following the dehydrohalogenation step, and the crude free 7-dehydrosterol then recovered directly from the dehydrohalogenation reaction mixture. Preferably I employ the process for producing 7-dehydrosterols which is disclosed and claimed in the copending application of William L. Ruigh, Serial No. 765,631, filed August 1, 1947. In that process a peroxide compound is employed to catalyze the halogenation step of the process since it has been discovered that greatly increased yields of the final 7-dehydrosterol may thus be obtained. In other respects the process of that application is quite similar to the processes described in the two patents referred to above.

The dehydrohalogenation reaction mixture upon completion of the dehydrohalogenation reaction will be made up of a rather diverse mixture of compounds. A certain amount of dehydrohalogenating agent will always be present since it is invariably used in excess of the calculated amount. There will also be present a fairly large amount of the hydrohalide salt of the dehydrohalogenating agent produced as a product of the reaction. The 7-dehydrosterol ester which is the intermediate product in the production of the desired 7-dehydrosterol will, of course, be present. In addition to the above materials, there will also be present a number of compounds produced from the original sterol ester. Among these compounds there will usually be one or more dienol esters other than the desired 7-dehydrosterol ester, a triene compound and various unknown steroidal materials arising from the original sterol ester as a result of side reactions both in the bromination and in the dehydrohalogenation.

At first glance it would seem to be a rather difficult matter to recover a 7-dehydrosterol ester from such a varied mixture of compounds and in fact the prior art, as has been pointed out above, has had to employ a rather inefficient and cumbersome process to make such a separation. Since it has been a difficult matter to recover a 7-dehydrosterol ester from the dehydrohalgenation reaction mixture, it would seem to be an even more difficult matter to recover a free 7-dehydrosterol from a dehydrohalogenation reaction mixture after saponification of the 7-dehydrosterol ester therein to produce the free 7-dehydrosterol. Such saponification increases the complexity of the mixture since the alkali will react not only with the 7-dehydrosterol ester but with several other components of the dehydrohalogenation reaction mixture, thus increasing the number and variety of the compounds in the mixture. However, I have found that notwithstanding the increased complexity of the dehydrohalogenation reaction mixture brought about by carrying out the saponification of the 7-dedrosterol ester therein, the free 7-dehydrosterol may be readily and easily recovered therefrom.

In carrying out the saponification of the 7-dehydrosterol ester and in the recovery of the free 7-dehydrosterol, I employ as a solvent vehicle an alcohol containing not more than four carbon atoms, e. g., methanol, ethanol, propanol and butanol, with ethanol being the alcohol preferably employed. The amount of alcohol used is not particularly critical except that an amount at least equal in volume to the volume of the dehydrohalogenation reaction mixture should be employed. In most cases an amount of alcohol equal to from at least about twice to about four to five times the volume of the dehydrohalogenation reaction mixture is preferably employed. The phrase "in an excess of" is employed in the claims to connote a volume of alcohol which is at least slightly greater than the volume of the dehydrohalogenation reaction mixture. By employing a volume of alcohol in excess of the volume of the dehydrohalogenation reaction mixture, one will ensure obtaining a homogeneous saponification reaction mixture and thus a more efficient saponification reaction. Furthermore, such an amount of alcohol is necessary in order to obtain the most efficient recovery of the free 7-dehydrosterol in the subsequent separation thereof from the saponification reaction mixture. Also when such an amount of alcohol and the preferred amount of alkali are employed, the ratio of alkali to alcohol may easily be adjusted so as to give an alcoholic alkali solution containing between about 5% and about 10% of alkali. Such a concentration of alkali in the alcohol gives excellent results in the saponification reaction. In order to obtain the most efficient yield of 7-dehydrosterol, it is necessary, of course, to employ sufficient alkali to split all of the esters in the dehydrohalogenation reaction mixture and to react with the hydrohalide salt of the dehydrohalogenating agent. It is preferred to employ about 20% more alkali than the amount theoretically required. A convenient way in which to determine the quantity of alkali to employ is to calculate the amount of alkali that would be needed to react with all of the halogen that was originally present in the halogenating agent used to halogenate the sterol ester plus the amount of alkali that would have been required to saponify all of the original sterol ester, and then to ensure complete saponification employ an amount of alkali about 20% greater than such calculated amount.

It will usually be found that when the preferred amount of alkali and the preferred strength of alcoholic alkali solution, i. e., between about a 5% and about a 10% solution, are employed, an amount of alcohol equal in volume to about two to about four times the volume of the dehydrohalogenation reaction mixture will be present. Larger amounts of alcohol than this may be employed if desired; however, larger amounts are not at all necessary. If desired, the alcohol may be replaced in part by other liquids compatible therewith. Thus, up to 15% of water may be admixed with the alcohol provided the alcohol is miscible with water to that extent, i. e., if the alcohol is methanol, ethanol, or propanol. Also, ether may be admixed with the alcohol in small amounts if desired. When using ethanol, any one of a number of different commercial grades of ethanol which has been denatured with volatile solvents may be employed if so desired. Although it is preferred to employ an amount of alkali about 20% greater than the amount theoretically required to saponify all the esters in the dehydrohalogenation reaction mixture and to react with all of the hydrohalide salt of the dehydrohalogenating agent which is formed, either larger or smaller amounts of alkali may be employed if desired. Thus amounts of alkali anywhere between the theoretical amount and the theoretical amount plus 35% or more may conveniently be used if desired. If an amount of alkali is employed which is much less than the theoretical amount, the yield of the desired 7-dehydrosterol will of course be diminished. Instead of employing an alcoholic alkali solution containing between about 5% and about 10% of alkali, one may use alcoholic alkali solutions having a somewhat greater or a lesser concentration of alkali than the preferred range. Thus, solutions containing as low as 1% of alkali may be employed if desired.

A fairly strong alkali should be used for the saponification and preferably I employ potassium hydroxide. However, alkalis such as sodium hydroxide, sodium ethoxide, potassium ethoxide, etc. may all be employed.

After the dehydrohalogenation reaction mixture is admixed with the alcoholic alkali solution, the saponification process may be carried out in any desired manner. A convenient way in which to carry it out is to heat the reaction mixture at the reflux temperature of the alcohol for a short time, e. g., 15 to 45 minutes. Preferably, but not necessarily, such heating is carried out in an inert gas atmosphere. If it is desired to heat the reaction mixture to a temperature higher than the reflux temperature of the alcohol, the reaction may be carried out under pressure. The saponification reaction may be carried out at relatively low temperatures if desired, i. e., at about room temperature or at a temperature only slightly above room temperature, particularly when a rather highly concentrated solution of the alcoholic alkali is employed, provided that the reaction is allowed to proceed for a somewhat longer period of time, e. g., by standing overnight, than when the reaction is carried out at a higher temperature. During the saponification reaction, the mixture may be stirred if desired and when large quantities of materials are involved stirring is often advantageous particularly if the reaction mixture is being heated.

Upon completion of the saponification reaction, all of the 7-dehydrosterol ester that was in the dehydrohalogenation reaction mixture will have been converted to the free 7-dehydrosterol. I have discovered that the free 7-dehydosterol may be readily recovered from the complex saponification reaction mixture in commercially acceptable purity and yield by merely cooling the reaction mixture to a temperature somewhat below room temperature, e. g., to about 10° C. or below and preferably to about 0° C. or below. At the low temperature the free 7-dehydrosterol and any other dienols in the reaction mixture will solidify and separate from the solution, usually in a crystalline form. The great majority of the other compounds in the saponification reaction mixture will remain in solution in the alcoholic solvent. By simply filtering or centrifuging the cold saponification reaction mixture, one may readily recover the crude free 7-dehydrosterol. It will be found that a fair amount of inorganic salts will have been filtered off with the crude 7-dehydrosterol. They will mainly be the alkali halide salts formed by the reaction of the saponification agent with the hydrohalide salt of the dehydrohalogenating agent, and the inorganic salts formed by the reaction of the saponification agent with the acyl radicals of the sterol esters during the saponification reaction. These inorganic salts are water-soluble, and by merely washing with water the material which has been filtered off from the cold saponification reaction mixture, the inorganic salts can be readily removed therefrom leaving the crude free 7-dehydrosterol in commercially acceptable purity and yield. The purity and yield of the free 7-dehydrosterol will be just as high, or higher, than that of 7-dehydrosterols produced by the prior art processes referred to hereinabove. Thus in most cases the crude 7-dehydrosterols obtained by the process of my invention will have a purity of 50% or greater whereas in the prior art processes referred to hereinabove the purity of the crude 7-dehydrosterol is in most cases below about 30%. If desired, the inorganic salts may be removed from the saponification reaction mixture prior to cooling the reaction mixture. This may be done by merely filtering or centrifuging the hot saponification reaction mixture following the completion of the saponificaton reaction since the inorganic salts which are formed in the saponification reaction are relatively insoluble in the alcoholic solvents. However, for ease and simplicity of operation it is preferred to remove the inorganic salts by a water wash of the filtered or centrifuged material separated from the cold saponification reaction mixture.

After cooling the alcoholic saponification reaction mixture to a low temperature and after partial crystallization has occurred, it is preferred to admix with the cooled mixture sufficient water to give a ratio of between about 10 parts of water to 90 parts of alcohol and about 15 parts of water to 85 parts of alcohol. The reason for this is that the free 7-dehydrosterol will be less soluble in such a solvent mixture at low temperatures than it would be in an alcohol relatively free of water. Thus the addition of the small amount of water will improve the efficiency of the separation of the free 7-dehydrosterol from the reaction mixture. If desired, such amounts of water may be admixed with the reaction mixture prior to cooling the mixture to the temperature somewhat below room temperature, e. g., see certain of the examples given hereinafter.

In some cases varying amounts of oily material may separate out along with the crude free 7-dehydrosterol and adhere thereto even after the water washing. Such material, however, which separates out and adheres to the crude 7-dehydrosterol may be readily removed therefrom by washing the separated crude 7-dehydrosterol, preferably after the water washing, with a cold solvent such as cold methanol, cold ethanol, cold acetone or any similar solvent. Such solvents may contain up to about 20% of water if desired. By reference to a "cold solvent" I mean a solvent which is at a temperature of about 10° C. or below. In most cases it is preferred to wash the recovered 7-dehydrosterol with such a solvent so as to ensure obtaining a product of improved purity. If the crystallization and separation of the crude 7-dehydrosterol are carried out without the addition of water to the saponification reaction mixture as referred to in the previous paragraph, much less oily material will separate out with the crude 7-dehydrosterol and the purity of the crude material will be increased as compared to when an addition of water is made; however, in such a case the total yield of 7-dehydrosterol is not quite as great as the total yield obtained when water is added.

I wish to emphasize again that the principal feature of my process is the elimination of what have heretofore been considered essential steps in the efficient production of a 7-dehydrosterol, i. e., separation and isolation of the 7-dehydrosterol ester. Although eliminating such steps, I obtain as good or better yields than are obtained with prior art processes, and the purity of the products I obtain is just as high, and usually higher, than that obtained by the prior art processes referred to hereinabove. The most important feature concerning my process is, of course, the substantial saving in time and cost made possible by the elimination of these steps heretofore considered to be essential.

In order to more strikingly point out the superiority of my process over the prior art processes, the following representative flow sheet diagrams of the prior art processes and of the process of my invention are presented:

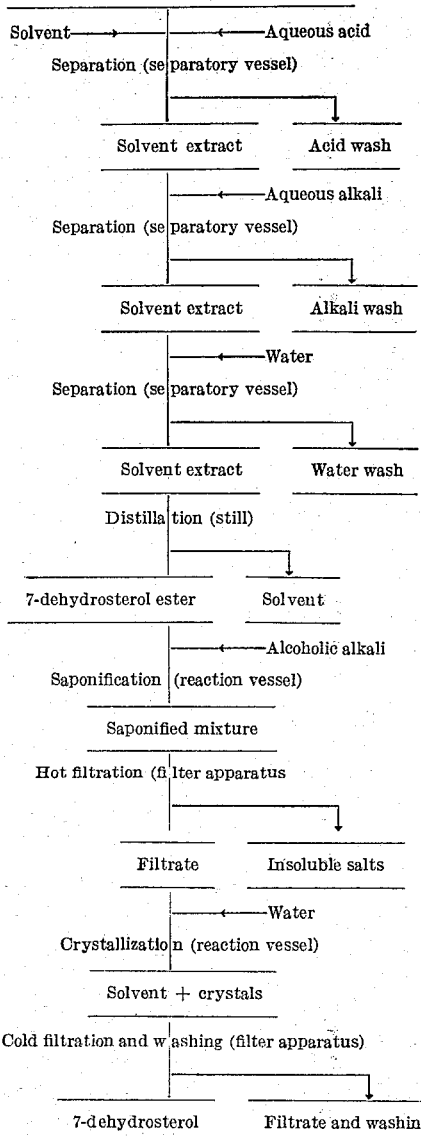

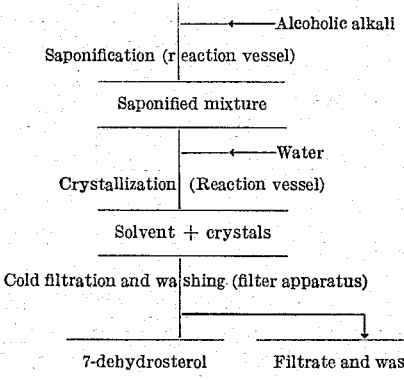

A mere glance at the two flow sheets given above will show the great superiority of the process of my invention over the processes of the prior art.

For a fuller understanding of the nature and

Example I

To a boiling hot solution of 2000 grams of recrystallized cholesteryl acetate in 8 liters of anhydrous hexane there were added 9.30 grams of lauroyl peroxide and 1040 grams of powdered, crude 96.05% N-bromosuccinimide. The halogenation reaction took place over a period of 13 minutes after which the reaction mixture was cooled to about 55° C. and filtered with suction. The succinimide which was filtered off was washed twice with 500 ml. each of hexane. The filtrate and washings were combined and 3 liters of dried diethylaniline added thereto, yielding a mixture weighing 10,821 grams.

971 grams of the mixture were heated on a water bath in vacuo ($N_2$ atm.) to distill the hexane. The residual diethylaniline solution thus obtained was heated at 90° C.–91° C. at 40 mm. pressure for 3 hours with stirring ($N_2$ atm.). To the reaction mixture there was then added a hot solution of 79.4 grams of 87% KOH pellets in 825 ml. of denatured ethanol and the mixture refluxed on the water bath for one-half hour with stirring ($N_2$ atm.). The reaction mixture was then chilled to +4° C. with stirring to crystallize the 7-dehydrocholesterol. Then 120 ml. of water were slowly added and the mixture stored at +2° C. overnight.

The solids were filtered off at room temperature and washed first with four 150 ml. portions of water and then with two 100 ml. portions of ice-cold 85% ethanol. The crude, crystalline 7-dehydrocholesterol was dried at 105° F. in a vacuum drier and yielded 99.9 grams of a dark-cream, crystalline solid.

From a spectroscopic analysis the following results were determined:

54.4% purity of sterol
30.25% overall yield from cholesteryl acetate
54.3 grams pure 7-dehydrocholesterol

Example II 1082 grams of the halogenation reaction mixture of Example I were heated on a water bath in vacuo ($N_2$ atm.) to distill the hexane. The residual diethylaniline solution was heated at 90°–91° C. at 25 mm. pressure ($N_2$ atm.) for 3 hours with stirring. To the reaction mixture there was then added a hot solution of 79.4 grams of 87% KOH pellets in 825 ml. of denatured ethanol, and the mixture refluxed on the water bath for one-half hour with stirring ($N_2$ atm.). The reaction mixture was then chilled to +4° C. with stirring to crystallize the 7-dehydrocholesterol. Then 120 ml. of water were slowly added and the mixture stored at −15° C. overnight.

The solids were filtered off at −15° C. and washed at room temperature with four 175 ml. portions of water. They were then washed at −15° C. with two 125 ml. portions of cold (−15° C.) 85% ethanol and dried at 106° F. in a vacuum drier, yielding 109.8 grams of a light-tan, crystalline solid.

From a spectroscopic analysis the following results were determined:

54.5% purity of sterol
33.35% overall yield from cholesteryl acetate
59.8 grams pure 7-dehydrocholesterol

Example III

To a hot solution of 200.0 grams of recrystallized cholesteryl acetate in 800 ml. anhydrous hexane there was added 0.565 gram (0.5 mole percent based on acetate used) of benzoyl peroxide and 101.5 grams (1.2 molar equivalents) of powdered, crude 98.0% pure N-bromosuccinimide. The halogenation reaction was carried out by heating the mixture on a steam bath with stirring.

After a total reaction period of about ten minutes, the reaction mixture was cooled to 55° C. and then filtered with suction using two 50 ml. portions of hexane as washings. The combined filtrate was added to 300 ml. of anhydrous, distilled diethylaniline, and the hexane distilled off in vacuo ($N_2$ atm.). The remaining solution was heated at 90°–95° C. for 3 hours with stirring in vacuo ($N_2$ atm.).

The reaction mixture was cooled to 75° C. and a hot solution of 79.3 grams 87% KOH pellets in 1100 ml. of ethanol was added. The mixture was refluxed for ½ hour ($N_2$ atm.) and filtered with suction using 100 ml. of hot ethanol to wash the insoluble salts filtered off.

To the combined, hot, dark amber filtrate there was added 150 ml. of hot water with shaking, and the mixture stored at room temperature overnight. A dark amber oily layer and a crystalline solid separated. The mixture was chilled with stirring in an ice-bath ($CO_2$ atm.) and then stored at −15° C.

The brown gummy material which separated was filtered off at −15° C. The adhering gum passed through the filter leaving a yellowish-brown solid on the filter. It was washed twice with cold (−15° C.) 85% ethanol and, after drying for 3 hours in a vacuum drier at 78° F., gave 168.8 grams of a tan-colored, slightly sticky solid as the crude 7-dehydrocholesterol.

From a spectroscopic analysis the following results were determined:

42.7% purity of sterol
40.2% overall yield from cholesteryl acetate
72.0% grams pure 7-dehydrocholesterol

Example IV

In this example the same amounts of reagents were used as in Example III. After the reaction was carried out for a total reaction period of ten and a third minutes, the reaction mixture was worked up as in Example III. The remaining diethylaniline solution was refluxed for ½ hour ($N_2$ atm.) with a solution of 79.3 grams 87% KOH pellets in 1100 ml. of ethanol and filtered hot. The insoluble salts that were filtered off were washed with 100 ml. of hot ethanol. The combined, dark amber filtrate was cooled to room temperature for crystallization and then stored at −15° C. overnight.

The light-tan crystalline solid which separated was filtered off at −15° C. and washed twice with 100 ml. each of cold (−15° C.) 85% ethanol. The product was dried in a vacuum drier at 78° F. for 3 hours and gave 106.3 grams crude 7-dehydrocholesterol as a cream-colored crystalline solid.

From a spectroscopic analysis the following results were determined:

56.5% purity of sterol
33.4% overall yield from cholesteryl acetate
60.15 grams pure 7-dihydrocholesterol

Example V

This experiment was carried out similarly to Example III except that five times the amounts of reagents were used and lauroyl peroxide was used in place of benzoyl peroxide. The reagents used were as follows:

1000 grams recrystallized cholesteryl acetate
4000 ml. anhydrous distilled hexane
4.65 grams (0.5 mole percent) lauroyl peroxide
513 grams (1.2 molar equivalents) powdered, crystallized 96.93% pure N-bromosuccinimide The reaction was carried out in the usual manner for a total reaction period of about nine and a half minutes. The reaction mixture was worked up as before using the following reagents:

500 ml. hexane as washings
1500 ml. anhydrous, distilled diethylaniline

At the end of the three hours' heating at 90°–95° C. in vacuo, the reaction mixture was cooled to 75° C. and a hot solution of 397 grams 87% KOH pellets in 4125 ml. of ethanol added. The mixture was refluxed for ½ hour with stirring ($N_2$ atm.) and filtered hot. The insoluble salts which were filtered off were washed with 375 ml. of hot ethanol. To the combined filtrate 600 ml. of hot water were added with stirring and the mixture heated to boiling to dissolve some separated material. The solution was then chilled in ice with stirring and a mixture of crystalline solid and gum separated. On chilling at −15° C. overnight most of the material separated as a gum so the mixture was reheated. Then 1500 ml. of ethanol were added, and the mixture heated to boiling and chilled as before.

The crude 7-dehydrocholesterol was filtered off at −15° C. A dark amber oily material which separated out along with the crystalline product passed through the filter. The crude sterol was washed with cold (−15° C.) 85% ethanol and after drying amounted to 635.6 grams of a tan-colored, sticky crystalline solid.

From a spectroscopic analysis the following results were determined:

52.3% purity of sterol
37.2% overall yield from cholesteryl acetate
333 grams pure 7-dehydrocholesterol

Example VI

This experiment was carried out in essentially the same manner as Example V except that benzoyl peroxide was used instead of lauroyl peroxide. The amounts of reagents employed were:

1000 grams recrystallized cholesteryl acetate
4000 ml. anhydrous, distilled hexane
2.83 grams (0.5 mole percent) benzoyl peroxide
513.0 grams (1.2 molar equivalents) powdered, crystallized 96.93% pure N-bromosuccinimide The reaction was carried out for a total reaction period of nine and three-fourths minutes and the mixture worked up in the usual manner using 1.5 liters of anhydrous, distilled diethylaniline.

After three hours' heating at 90°–95° C. with stirring in vacuo ($N_2$ atm.), the dehydrohalogenation reaction mixture was cooled to 75° C. and the 7-dehydrocholesteryl acetate then hydrolyzed by refluxing the reaction mixture for ½ hour ($N_2$ atm.) with a solution of 397 grams 87% KOH pellets in 4125 ml. of ethanol. The hot reaction mixture was filtered, and the insoluble salts which were filtered off were washed with 375 ml. of hot ethanol. The combined filtrate was chilled in ice with stirring ($N_2$ atm.) until crystallization had largely taken place. Water (600 ml.) was then slowly added with stirring and the mixture, after it had been thoroughly chilled in ice water, was stored at −15° C. overnight.

The crude 7-dehydrocholesterol which separated out along with an oily, dark amber material was filtered off at −15° C. The adhering oily material passed through the filter. The crude sterol was washed with cold (−15° C.) 85% ethanol and, after drying in the usual manner, amounted to 588.3 grams of a tan-colored, crystalline, sticky solid.

A spectroscopic analysis of the material gave the following results:

53.4% purity of sterol
35.0% overall yield from cholesteryl acetate
314 grams pure 7-dehydrocholesterol From the above description and examples it is readily apparent that the process of my invention provides a much simpler and more efficient means for producing 7-dehydrosterols than any of the prior art processes. Although the detailed illustrative examples given above all show the production of 7-dehydrocholesterol, it is to be definitely understood that the process of my invention is not limited to the production of 7-dehydrocholesterol. The process of my invention is quite applicable to the preparation of a 7-dehydrosterol from any of the sterols referred to in the British patent, the French patent or the U. S. patent application referred to hereinabove, or from any other sterol of the same general characteristics.

Having described my invention, what I claim as new and desire to secure by Letters Patent is:

1. In a process for producing a 7-dehydrosterol, the step which comprises saponifying a 7-dehydrosterol ester in the dehydrohalogenation reaction mixture in which the 7-dehydrosterol ester was formed.

2. In a process for producing 7-dehydrocholesterol, the step which comprises saponifying a 7-dehydrocholesterol ester in the dehydrohalogenation reaction mixture in which the 7-dehydrocholesterol ester was formed.

3. A process for producing a 7-dehydrosterol which comprises saponifying a 7-dehydrosterol ester in the dehydrohalogenation reaction mixture in which the 7-dehydrosterol ester was formed and thereafter separating the 7-dehydrosterol from the reaction mixture.

4. A process for producing 7-dehydrocholesterol which comprises saponifying a 7-dehydrocholesterol ester in the dehydrohalogenation reaction mixture in which the 7-dehydrocholesterol ester was formed and thereafter separating the 7-dehydrocholesterol from the reaction mixture.

5. A process for producing 7-dehydrocholesterol which comprises saponifying 7-dehydrocholesteryl acetate in the dehydrohalogenation reaction mixture in which the 7-dehydrocholesteryl acetate was formed and thereafter separating the 7-dehydrocholesterol from the reaction mixture.

6. A process for producing 7-dehydrocholesterol which comprises saponifying 7-dehydrocholesteryl benzoate in the dehydrohalogenation reaction mixture in which the 7-dehydrocholesteryl benzoate was formed and thereafter separating the 7-dehydrocholesterol from the reaction mixture.

7. A process for producing a 7-dehydroesterol which comprises dissolving a dehydrohalogenation reaction mixture containing a 7-dehydrosterol ester in an excess of an alcoholic alkali solution employing an alcohol containing not more than four carbon atoms, saponifying the 7-dehydrosterol ester in the resulting solution, thereafter cooling the solution to a temperature somewhat below room temperature, and recovering from the solution the 7-dehydrosterol which separates therefrom.

8. A process for producing 7-dehydrocholesterol which comprises dissolving a dehydrohalogenation reaction mixture containing a 7-dehydrocholesterol ester in an excess of an alcoholic alkali solution employing an alcohol containing not more than four carbon atoms, saponifying the 7-dehydrocholesteryl ester in the resulting solution, thereafter cooling the solution to a temperature somewhat below room temperature, and recovering from the solution the 7-dehydrocholesterol which separates therefrom.

9. A process for producing 7-dehydrocholesterol which comprises dissolving a dehydrohalogenation reaction mixture containing 7-dehydrocholesteryl acetate in an excess of an alcoholic alkali solution employing an alcohol containing not more than four carbon atoms, saponifying the 7-dehydrocholesteryl acetate in the resulting solution, thereafter cooling the solution to a temperature somewhat below room temperature, and recovering from the solution the 7-dehydrocholesterol which separates therefrom.

10. A process for producing 7-dehydrocholesterol which comprises dissolving a dehydrohalogenation reaction mixture containing 7-dehydrocholesteryl benzoate in an excess of an alcoholic alkali solution employing an alcohol containing not more than four carbon atoms, saponifying the 7-dehydrocholesteryl benzoate in the resulting solution, thereafter cooling the solution to a temperature somewhat below room temperature, and recovering from the solution the 7-dehydrocholesterol which separates therefrom.

11. The process of claim 7 wherein ethanol is the alcohol employed.

12. The process of claim 11 wherein potassium hydroxide is the alkali employed.

13. The process of claim 8 wherein ethanol is the alcohol employed.

14. The process of claim 13 wherein potassium hydroxide is the alkali employed.

15. The process of claim 9 wherein ethanol is the alcohol employed.

16. The process of claim 15 wherein potassium hydroxide is the alkali employed.

17. The process of claim 10 wherein ethanol is the alcohol employed.

18. The process of claim 17 wherein potassium hydroxide is the alkali employed.

KURT HERBERT SCHAAF.

REFERENCES CITED

The following references are of record in the file of this patent:

UNITED STATES PATENTS

| Number | Name | Date |
| --- | --- | --- |
| 2,441,091 | Vliet | May 4, 1948 |

FOREIGN PATENTS

| Number | Country | Date |
| --- | --- | --- |
| 574,432 | Great Britain | Jan. 4, 1946 |